United States Patent [19]

Lambuth

[11] Patent Number: 4,659,604
[45] Date of Patent: Apr. 21, 1987

[54] ADHESIVE/NAIL PLATE TRUSS ASSEMBLY

[75] Inventor: Alan L. Lambuth, Boise, Id.

[73] Assignee: Boise Cascade Corporation, Boise, Id.

[21] Appl. No.: 831,284

[22] Filed: Feb. 20, 1986

[51] Int. Cl.⁴ ............................................. B32B 3/06
[52] U.S. Cl. .................... 428/99; 52/DIG. 6; 144/353; 156/91; 411/457; 411/466; 411/921; 428/132
[58] Field of Search .................... 144/353; 156/91, 92; 411/457, 466, 921; 428/99, 100, 132; 52/DIG. 6

[56] References Cited

U.S. PATENT DOCUMENTS

| | | |
|---|---|---|
| 692,909 | 2/1902 | Roberts . |
| 1,405,889 | 2/1922 | Barling . |
| 2,718,485 | 9/1955 | Samuely ............................ 156/91 X |
| 3,225,643 | 12/1965 | Couch ................................ 411/466 |
| 3,345,792 | 10/1967 | Chandler ............................ 52/648 |
| 3,478,409 | 11/1969 | Votaw et al. ...................... 156/92 X |
| 3,651,612 | 3/1972 | Schmitt ............................... 52/693 |
| 3,723,215 | 3/1973 | Kessler ................................ 156/92 |
| 3,731,583 | 5/1973 | Jureit ................................. 411/466 |
| 3,875,719 | 4/1975 | Menge ................................ 52/669 |

Primary Examiner—Robert A. Dawson
Attorney, Agent, or Firm—Laubscher & Laubscher

[57] ABSTRACT

An assembly for connecting the wooden members of a truss is disclosed, characterized by the use of a combination of adhesive and a connecting plate. The connecting plate is formed of metal and includes a plurality of nail-like projections which extend from and normal to a planar portion of the plate. A layer of adhesive is applied to the extremities of all of the projections. The wooden members to be joined are arranged in a desired configuration and the adhesive-covered projections of the plate are driven into adjoining members. In addition to the nail-like bond between the plate and the truss members, an adhesive bond is formed between the metal projections and the wood. The resulting joint has increased resistance to tensile, shear, and rotational forces.

7 Claims, 13 Drawing Figures

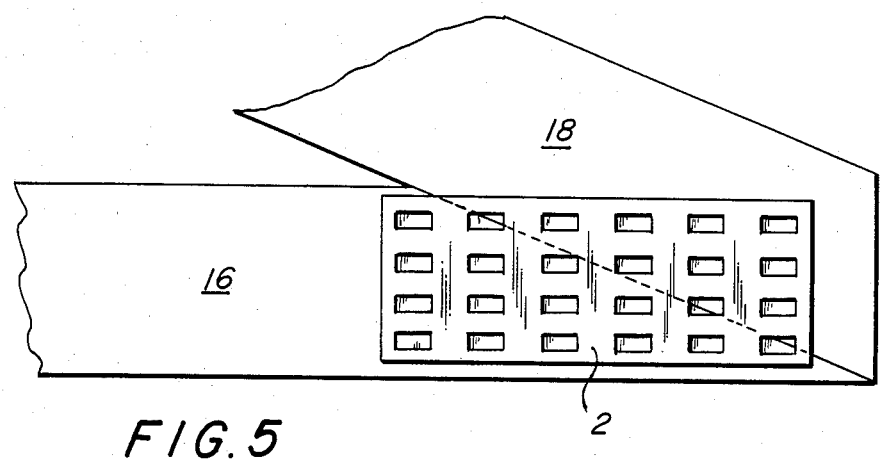
FIG.5
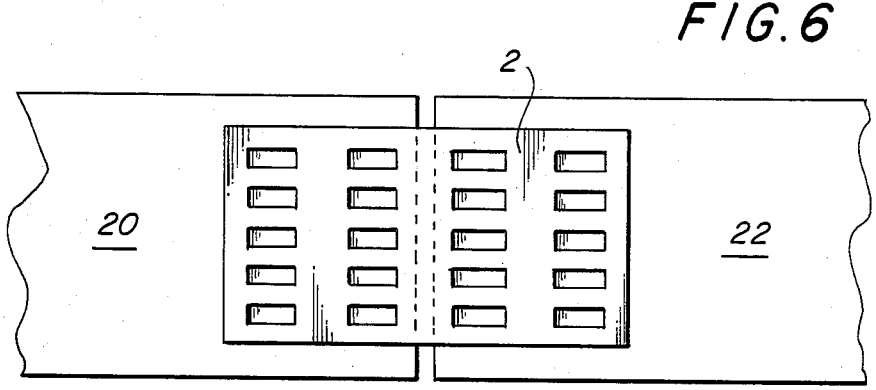
FIG.6
FIG.7
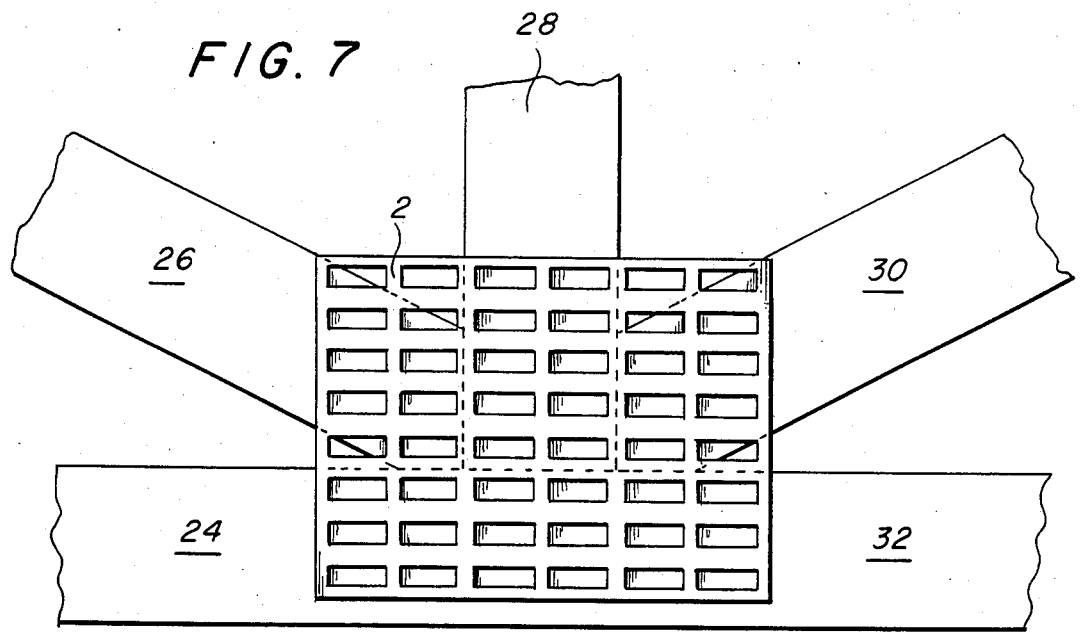

ADHESIVE/NAIL PLATE TRUSS ASSEMBLY

BACKGROUND OF THE INVENTION

The present invention relates to an assembly for connecting the wooden members of a truss using nail plates and adhesive to obtain greater strength and stability.

Conventional nail plate trusses are made from selected grades of softwood lumber assembled with toothed metal plates which are driven into the lumber at all junction points with hydraulic or roll pressure. The lumber is chosen by grade to have appropriate strength for the function it performs in the truss, such as top chord, bottom chord and web members. The steel in the galvanized metal toothed plates is likewise selected and controlled for the highest strength level which still permits die-punching and bending to form the individual teeth. By these material selection processes, the building loads which the trusses will carry are maximized for a given size of lumber and truss span.

Trusses designed and assembled in this manner are vulnerable to loss of load-bearing capability by any movement of the wood members which tends to loosen the embedded metal teeth of the nail plates. This kind of movement includes lateral flexing of the trusses during transport, unloading, job-site handling and erection. It also includes loosening due to changes in moisture content of the lumber by repeated cycling through a wide range of seasonal humidity changes or simply drying of the lumber from an original green (or wetted) condition to heated inside dry conditions.

The strength of nail plate trusses is also limited by the extreme pressure placed on the metal teeth of the nail plates at certain points of the truss assembly, particularly at the outboard corners or heels where the plates are subject to great shear and rotational forces as the truss is loaded. Thus, the force on these heel plates which tends to rotate the metal teeth out of the wood actually limits the allowable load which the truss can carry. Similarly, limiting forces also occur in tensile joints in the bottom truss chord and in certain other multiple point truss member connections.

Before the metal nail plate concept and assembly came into general use, trusses were most often assembled with nailed and glued plywood gusset plates at all points of juncture. The strength of the glued wood-to-wood bond provided a very substantial contribution to the load bearing capability of the nails in the wooden gusset plate. The glue bond contributed not only resistance to joint separation due to lateral flexure during the handling and erection but also substantial load-bearing strength to the joint itself, especially in resisting shear and tensile forces among the elements of the truss. Moreover, the nails in the gusset plates could be omitted entirely if the joints were left under pressure long enough to completely cure the glue while maintaining continuous surface contact. As well as these gusset-plated trusses performed, they have been largely replaced by toothed metal plate trusses on the basis of speedier and easier assembly resulting in lower costs.

BRIEF DESCRIPTION OF THE PRIOR ART

Previous attempts have been made at improving the connection between pieces of wood to form a laminated veneer structure or a truss as evidenced by the U.S. Pat. Nos. to Roberts 692,909, Barling 1,405,899, Couch 3,225,643, Chandler 3,345,792 and Schmitt 3,651,612.

The Roberts patent, for example, discloses a metal sheet including a plurality of projections on either side thereof which penetrate the veneer sheets on each side of the metal sheet. A layer of cement is provided between the veneer sheets and the metal sheet to form an integral bond.

The Barling patent teaches a spar or frame, mainly intended for aircraft construction, wherein wooden members are joined by trusses fastened to the sides of the wooden members by a combination of glue and screws or nails. The Chandler patent discloses a wooden truss in which glued plywood gusset plates are provided at the lumber connection points.

Finally, the patents to Couch and Schmitt disclose the use of the aforementioned toothed metal plates for connecting wood truss members.

As noted above, the primary drawback of the prior glued plywood gusset plate truss assemblies is that they are difficult and time-consuming to build. Moreover, conventional nail plate truss assemblies are not sufficiently resistant to lateral displacement forces and are limited in strength by the reduced tooth or nail withdrawal resistance of lower density pieces of lumber in the truss assembly.

The present invention was developed in order to overcome these and other drawbacks of the prior art by providing an improved assembly for connecting the wooden members of a truss using toothed metal plates plus an adhesive to obtain greater strength and stability.

SUMMARY OF THE INVENTION

Accordingly, it is a primary object of the invention to provide an assembly for connecting the wooden members of a truss including a metal connecting plate having a planar body portion and a plurality of nail-like projections extending from one side thereof and a layer of adhesive applied to the contacting surface of the connecting plate. Thus, when two wooden truss members are arranged in a desired configuration with the connecting plate bridging the junction therebetween and the nail-like projections are driven into the adjoining members, the members are connected together by the adhesive/metal plate assembly. The joint formed between the members has increased resistance to tensile, shear and rotational forces owing to the adhesive bond between the metal plate and the wooden members.

According to a more specific object of the invention, the adhesive layer is applied only on the nail-like projections of the metal plate.

It is another object of the invention to provide a layer of adhesive which cures under ambient assembly conditions to a rigid hard bond.

According to a further object of the invention, the adhesive comprises an appropriately catalyzed thermoset polymer which develops a weatherproof permanent bond between wood and metal surfaces.

BRIEF DESCRIPTION OF THE FIGURES

Other objects and advantages of the invention will become apparent from a study of the following specification when viewed in the light of the accompanying drawing, in which:

FIGS. 5 and 6 are plan views of the connecting plate forming heel and butt joints, respectively between the wooden members of a truss;

FIGS. 7 and 8 are plan views of the connecting plate forming highly stressed composite joints involving both tensile and rotational shearing forces at the bottom center span of Queen and Scissors trusses, respectively;

DETAILED DESCRIPTION

Figure 3:
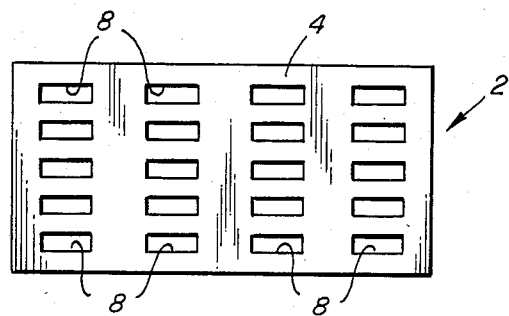
FIGS. 1, 2, and 3 are front, side, and top plan views of a connecting plate according to the invention.
Figure 1:
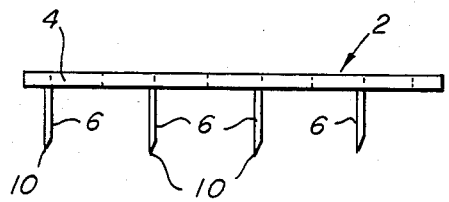
Figure 2:
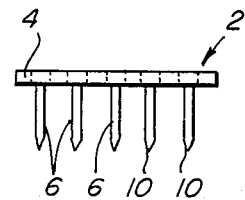

Referring first to FIGS. 1–3, the toothed metal or connecting plate 2 according to the invention will be described. The plate is preferably formed from a generally planar sheet of galvanized steel and includes a planar portion 4 and a plurality of integral nail-like teeth or projections 6. The projections are stamped or punched by a die from the planar portion leaving a plurality of apertures 8 therein. As shown in the drawing, the projections are uniformly arranged in spaced rows and extend generally normal to the plane containing the planar portion. The lower extremities 10 of the projections are cut and formed to a pointed nail-like configuration to assist in penetrating the wooden truss members as will be set forth in greater detail below.

Figure 4A:
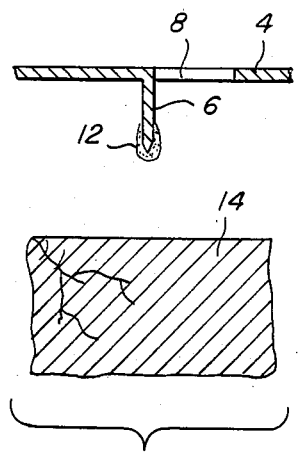
FIGS. 4a, 4b, and 4c are partial sectional views illustrating the connection between the adhesive/connecting plate assembly and a piece of wood.

A layer of adhesive material 12 is provided on the contacting surfaces of the connecting plate for bonding to the wooden members. Although the adhesive may be applied to the undersurface of the planar portion 4 to provide a maximum bonded area, it is preferably applied only to the extremities 10 of the nail-like projections 6 as shown in FIG. 4a. Where the adhesive is applied to the entire flat undersurface area of the plate 4, excess adhesive has a tendency to seep and squeeze out through the apertures 8 in the plate, fouling the set-up jigs and presses of the truss-forming apoaratus, as well as the trusses themselves. Attempts to minimize the quantity of adhesive applied to the undersurface of the connecting plate to reduce seepage of the adhesive from the apertures run the risk of providing an insufficient quantity to bridge the gaps between irregular wood and metal surfaces, thereby inherently weakening the bond therebetween. This is especially true if the plates are not set completely flush with the wood surfaces during the pressing operation, a fairly common occurrence.

By limiting the adhesive application to the surfaces of the nail-like projections 6 of the metal plate 4, such fouling of the truss and assembly apparatus is avoided and intimate contact between the wood and metal surfaces to be bonded is virtually assured.

Figure 4B:
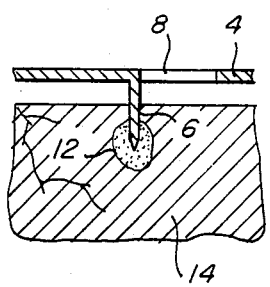
Figure 4C:
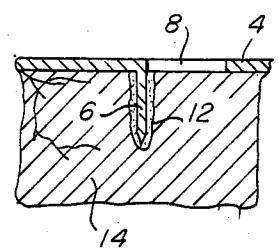

Prior to assembly, the adhesive is generously applied to the lower quarter to lower half of the nail-like projections or in a thin film to their entire length. With the wooden members of the truss arranged in the desired configuration, the connecting plate 2 is pressed against the adjacent wooden members to drive the projections into the wood 14 as shown in FIGS. 4a–c. As each nail-like projection penetrates the wood under clamping pressure, the adhesive spreads up the sides of the projection along its entire length with virtually no seepage or squeeze-out of adhesive through the plate apertures 8. Upon subsequent curing of the adhesive, each projection of the connecting plate is bonded in place in the wood.

As shown in FIGS. 5 and 6, the connecting plate 2 may be formed of any dimension and configuration. To form a heel joint at the outer corners of a triangular truss where the bottom tension chord 16 is connected with a top compression member 18 as shown in FIG. 5, an elongated rectangular connecting plate is preferably used. A butt tension joint between the ends of two adjacent wooden members 20, 22 is preferably formed using a shorter connecting plate as shown in FIG. 6. Other configurations of the connecting plate are also regularly used.

Figure 8:
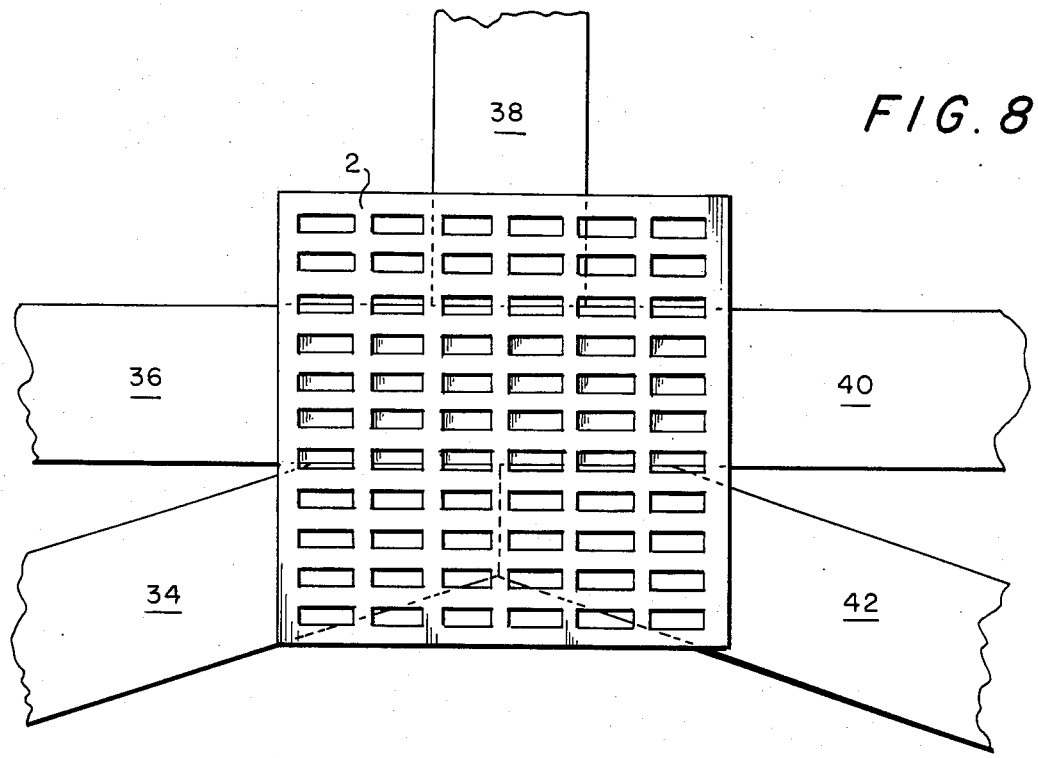

Connecting plates 2 of a different configuration are shown in FIGS. 7 and 8 for typical highly stressed composite connecting plate joints in commercial truss designs. In particular, these critical joints can benefit from the increase in strength gained through the application of an appropriate adhesive. In FIG. 7 there is shown a Queen truss formed from wooden members 24, 26, 28, 30, and 32 and FIG. 8 illustrates a scissors truss formed from wooden members 34, 36, 38, 40, and 42.

An adhesive/connecting plate joint for a truss is cost effective since the only additional labor is that of quickly applying the adhesive to the extremities of the plate projections such as by dipping the projections into a shallow tray of adhesive, plus the relatively minor cost of the adhesive itself. The economy of this method of application is illustrated by the fact that a 12 square-inch plate requires less than a gram of adhesive on its nail-like projections in order to develop increased joint strength. Alternatively, it is possible to pre-apply adhesives to the plate projections prior to inventory and use by employing specialized encapsulation or layering techniques for the adhesives which are then dry to the touch and stable for reasonable lengths of time in storage. These adhesive systems are activated by the friction, localized mixing, and intimate wood-metal contact produced by pressing the treated plate projections into the wooden truss members. Especially with the latter adhesives, assembly line techniques, clamping methods and time remain unchanged.

The adhesive used in accordance with the invention must be capable of bonding permanently to both metal and wood without special preparation of either surface and must yield a weatherproof exterior bond. The adhesive must be capable of curing at the ambient seasonal temperatures within a manufacturing plant; for example, as low as 40° to 45° F. There is no particular curing time limit. Rather, the adhesive simply must be able to develop a full cure over time at the minimum temperatures specified. The cured state of the adhesive must be rigid and creep resistant as opposed to elastomeric. Adhesives which cure only to a rubbery hardness permit sufficient movement and distortion of the connecting plate and projections so that no improvement in strength over unglued plates is evident. The adhesive must also be able to cure in films of significant thickness without losing strength due to shrinkage and stress-cracking from loss of a solvent phase. Although the adhesive may contain a solvent, it should be of high enough solids content to be classified as a functional gap-filling composition. Finally, the adhesive may be of either a single-component or multiple-component type.

Epoxy and isocyanate adhesives are typical of those which meet the above requirements for use with toothed metal connecting plates in forming wood trusses.

Figure 9:
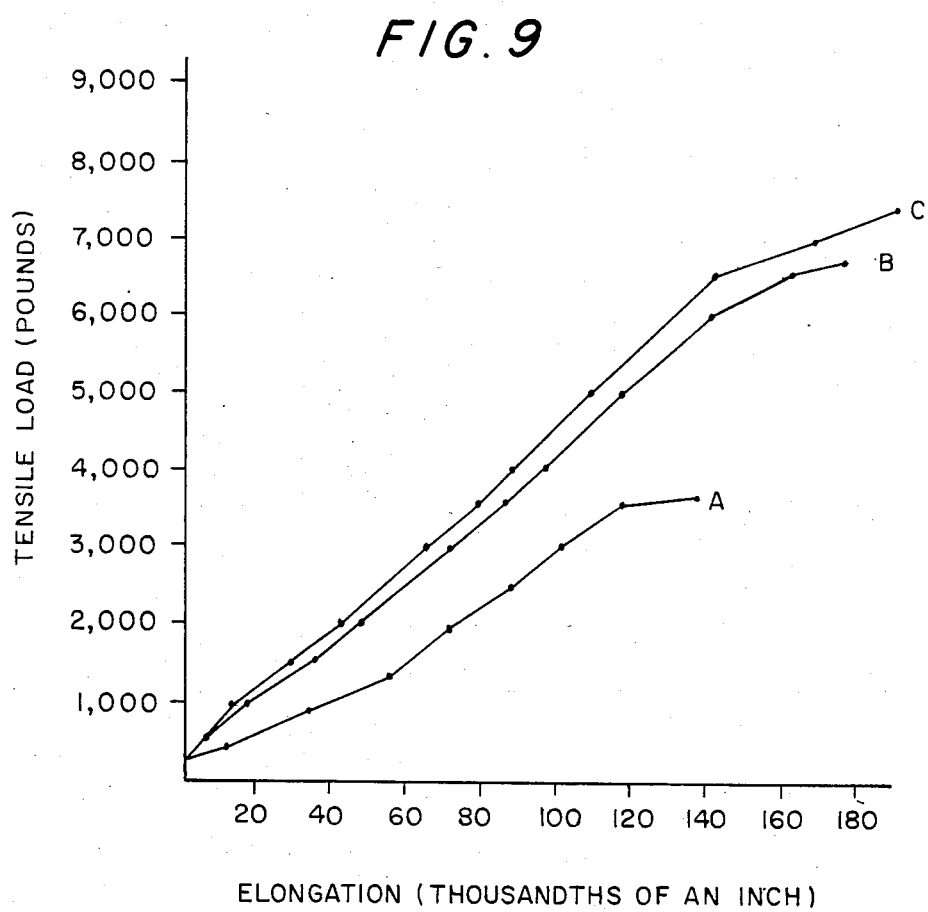
FIG. 9 is a graphical illustration of the increased tensile strength afforded by the invention over prior truss assemblies.

FIG. 9 illustrates the tensile strength of toothed metal plate butt joints in 2"×4" lumber with and without adhesive applied to the teeth. Curve A represents the tensile strength of the butt joint joined only by a pair of 3"×4" 20 gage toothed metal plates of commercial design without adhesive. As shown therein, the maximum tensile load is on the order of 3500 pounds.

Curve B illustrates the tensile strength of a matched 2"×4" lumber butt joint formed by an identical pair of toothed metal connecting plates having a two-component vinyl emulsion-isocyanate adhesive applied to the ends of the projections of the plates at the rate of one-half gram per 3"×4" plate. Such an adhesive cures to a rigid hard bond and has good gap-filling properties. It is specifically designed to bond metals to wood and cures at temperatures as low as 35° F. One example of such an adhesive is Isoset 402 manufactured by Ashland Chemical Company.

Curve C illustrates the tensile strength of a matched 2"×4" butt joint formed by an identical pair of toothed metal connecting plates having a two-component, amine-cured epoxy resin adhesive which has been thickened with inorganic filler applied to the ends of the projections of the plates at the rate of one-half gram per 3"×4" plate. The adhesive composition bonds well to both wood and metal and cures to a rigid hard bond at temperatures as low as 40° F. The bonds are permanent and exterior durable.

As shown by both curves B and C, the tensile strength of butt joints formed by the combination of adhesive with connecting plates having 10 teeth per square inch is approximately twice that of a butt joint formed with the connecting plates alone. The curves also illustrate the apparent upper limit to the joint strength which is attainable. At about 7000 pounds of tensile load on the glued 3"×4" metal connecting plates, the plates themselves begin to stretch and progressively deform, extracting one row of embedded projections after another as the load continues to increase. Thus, for the commonly used 20 gage thickness of connecting plate when appropriately bonded, metal failure appears to establish the upper limit of joint strength.

With thicker plates such as on the order of 16 gage, wood crushing and bond breaking around the glued projections will always precede metal deformation by stretching, although at higher load levels than for the unglued metal plates alone.

Figure 10:
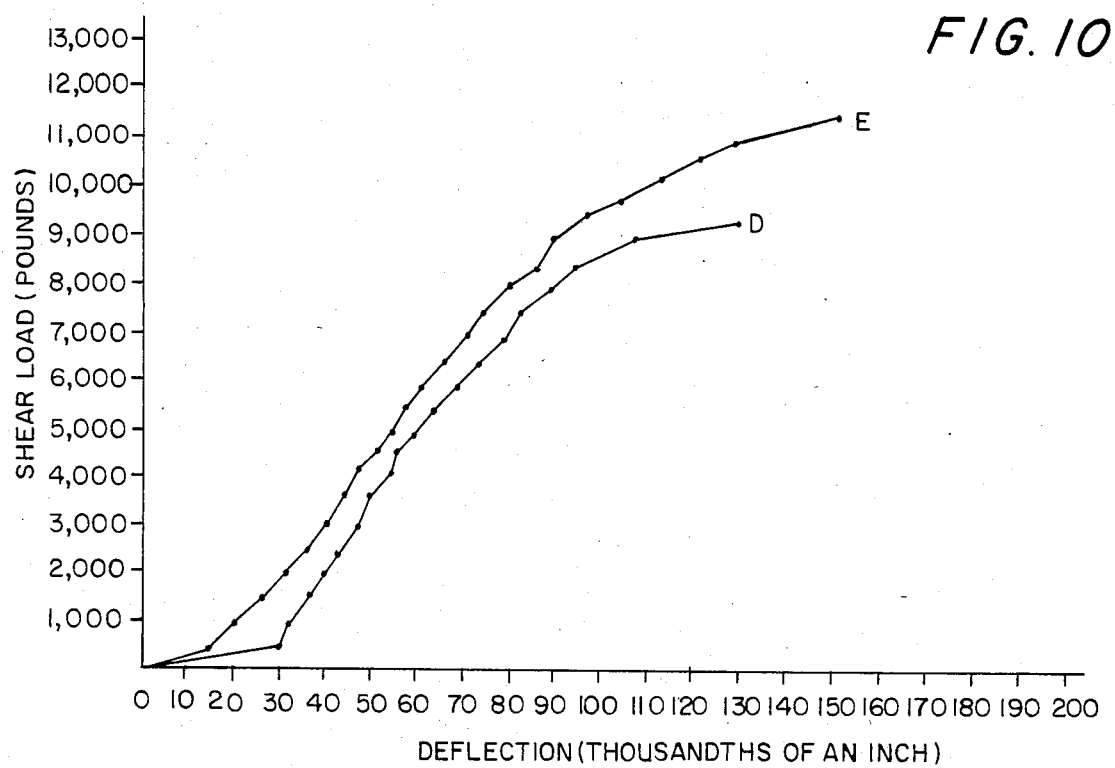
FIG. 10 is a graphical illustration of the increased shear strength afforded by the invention over prior truss assemblies utilizing heavy gage toothed metal connector plates.

FIG. 10 illustrates the shear strength of 3"×6" 16-gage toothed metal heel joints in 2"×4" lumber with and without adhesive applied to the teeth. Curve D illustrates the ultimate shear strength of the heel joint using unglued plates. As shown therein, the maximum shear load is 9450 pounds. Curve E illustrates the ultimate shear strength of a heel joint formed by an identical pair of toothed metal connecting plates having a two-component amine-cured epoxy resin adhesive applied to the ends of the projections of the plates at the rate of about one gram per 3"×6" plate. As shown in FIG. 5, the maximum shear load is 12,200 pounds. Thus, even using the heaviest available gage of metal connecting plate, very substantial increases in shear as well as tensile joint strength are obtained by employing the adhesive/toothed metal plate assembly according to the invention.

Tests have also shown that increases in glued metal plate joint strength are greatest when used on low density truss lumber.

For example, different pieces of visual or machine-graded lumber in a truss may meet all normal grade criteria and yet vary considerably from each other in density. Since the holding strength of toothed metal connector plates appears to depend largely on the density of the wood into which the teeth are driven, the lowest density wooden member in a bottom truss chord, for instance, will tend to limit both the working and ultimate strength of the truss element and possibly the truss itself. By enhancing the holding strength of metal connector plate teeth embedded in wood, the gluing technique of the present invention preferentially raises the strength of joints in the lower density lumber elements of a truss to higher and safer levels.

In addition to the specific adhesives identified above, many other adhesives meeting the curing, bonding and physical property criteria previously set forth would be satisfactory in the practice of the present invention. For example, the adhesive may comprise an active two-component system, the elements of which are deposited in layers on the metal connector plate teeth and which are kept separate from each other by impermeable barrier coatings. Mixing and curing of the components is accomplished by the friction, pressure and intimate contact which develop as the metal teeth are driven into wood surfaces. Similarly, an active two-component adhesive which is encapsulated separately in microspheres, mixed and spread on the metal surfaces with an aporopriate temporary binder can be activated and cured by this mechanism. Alternatively, a catalyzing substance can be applied to the metal plate teeth in a thin layer and dried or coated for inventory. Activation of the system is accomplished by dipping the coated teeth in a solution of suitable polymer, for instance. The order of materials coated and dipped may also be reversed. Finally, single-component adhesives which cure under the influence of an atmospheric constituent such as oxygen or moisture may also be used. Isocyanates and cyanoacrylates are typical adhesives of this type.

Figure 11:
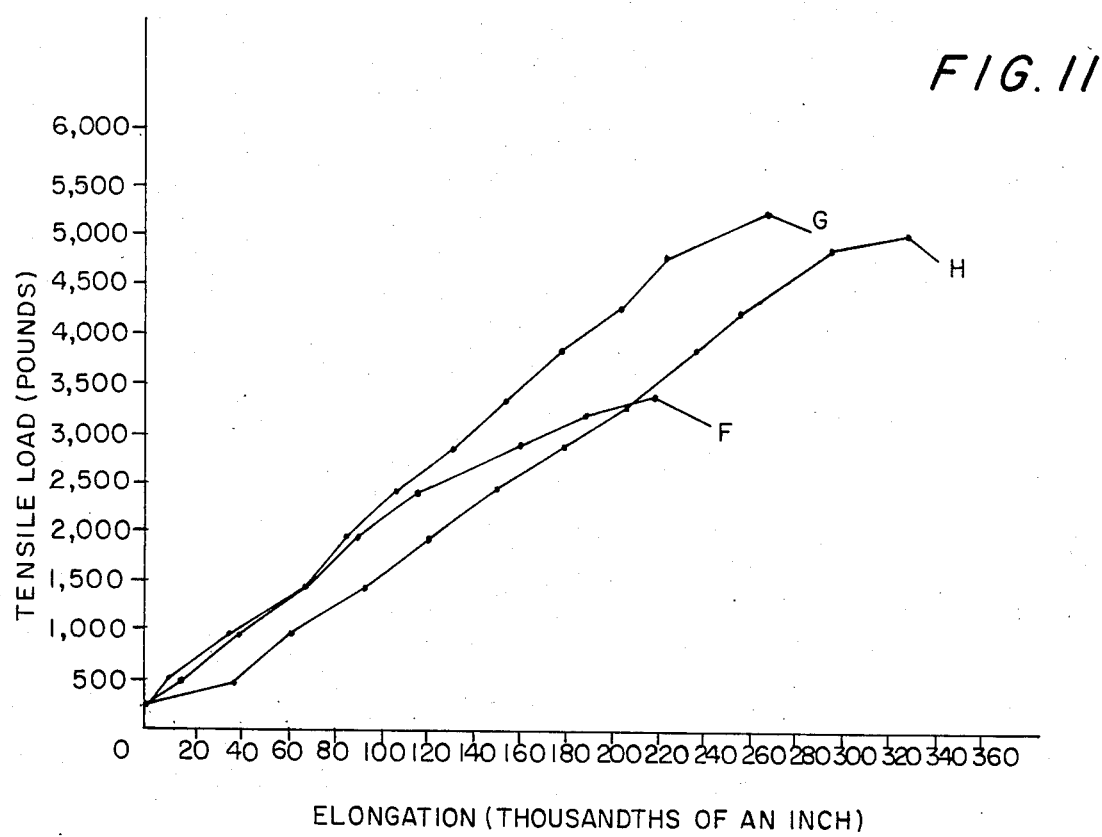
FIG. 11 is a graphical illustration of the increased tensile strength afforded by the invention over prior truss assemblies when single-component adhesives are employed to bond the toothed metal connector plates.

FIG. 11 illustrates the use of both the encapsulated two-component and single-component moisture-activated types of adhesive for bonding toothed metal connector plates across butt joints in matched pieces of 2"×4" lumber. The metal plates are 3" by 4" 20-gage with 8 teeth per square inch. Curve F illustrates the ultimate tensile strength of the joint using unglued plates. As shown therein, the maximum tensile load is 3755 pounds. Curve G illustrates the ultimate tensile strength of the joint using a single-component polyisocyanate adhesive applied to the metal plate teeth at the rate of one-half gram per 3"×4" plate. The maximum load for these glued plates is 5425 pounds. Curve H illustrates the ultimate tensile strength of the joint using an encapsulated two-component epoxy resin adhesive applied to the metal plate teeth at the rate of one-half gram per 3"×4" plate. The maximum load for these glued plates is 5210 pounds.

While in accordance with the provisions of the Patent Statutes the preferred forms and embodiments have been illustrated and described, it will be apparent to those skilled in the art that various changes and modifications may be made without deviating from the inventive concepts set forth above.

What is claimed is:

1. An assembly for connecting the wooden members of a truss, comprising
   (a) a metal connecting plate having a generally planar body portion and a plurality of integral nail-like projections extending from one side of and in a direction normal to the plane containing said body portion; and
   (b) a thin layer of adhesive material arranged on the surface of said projections, said adhesive comprising a two component thermoset material which cures to a rigid and permanent band on both wood and metal surfaces at an ambient temperature, whereby when the members of wood are arranged in a desired configuration with the connecting plate bridging the junction therebetween and when the nail-like projections of the connecting plate are driven into the adjoining beams, the friction between the projections and the beams mixes the adhesive components and the joint formed between the beams has an increased resistance to tensile, shear, and rotational forces owing to the adhesive bond between the metal plate and the wooden members.

2. The assembly as defined in claim 1, wherein said adhesive material comprises a two-component vinyl emulsion-isocyanate polymer system.

3. The assembly as defined in claim 1, wherein said adhesive comprises a two component, amine-cured epoxy resin.

4. The assembly as defined in claim 3, wherein said adhesive further comprises a thickening agent.

5. The assembly as defined in claim 1, wherein said adhesive comprises a two-component, resin-hardener system which is applied in layers to said projections with barrier coatings arranged between and protecting said layers.

6. The assembly as defined in claim 1, wherein said adhesive comprises a two-component resin-hardener system in which said components are separately encapsulated, mixed in appropriate proportions, and applied with a compatible temporary binder to the surfaces of said projections.

7. The assembly as defined in claim 1, wherein said adhesive comprises a two-component, acid-catalyzed urea-formaldehyde polymer, whereby use of the resulting structure is limited to covered applications of limited duration.

* * * * *